(12) United States Patent
Meng et al.

(10) Patent No.: US 8,858,095 B2
(45) Date of Patent: Oct. 14, 2014

(54) OPTICAL-ELECTRICAL CONNECTOR HAVING A RESILIENT MEMBER FOR URGING FERRULE AGAINST LENS MEMBER

(75) Inventors: Jin-Hua Meng, Kunshan (CN);
Ya-Dong Zhu, Kunshan (CN);
Yun-Cheng Hou, New Taipei (TW);
John Chow, Saratoga, CA (US)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 277 days.

(21) Appl. No.: 13/419,659

(22) Filed: Mar. 14, 2012

(65) Prior Publication Data
US 2013/0077921 A1 Mar. 28, 2013

(30) Foreign Application Priority Data

Sep. 28, 2011 (CN) .......................... 2011 1 0293534

(51) Int. Cl.
*G02B 6/36* (2006.01)
*G02B 6/42* (2006.01)
(52) U.S. Cl.
CPC .............. *G02B 6/426* (2013.01); *G02B 6/4237* (2013.01); *G02B 6/4292* (2013.01); *G02B 6/4204* (2013.01); *G02B 6/425* (2013.01); *G02B 6/4246* (2013.01); *G02B 6/4206* (2013.01)
USPC .......................................................... 385/93
(58) Field of Classification Search
CPC .. G02B 6/4204; G02B 6/4206; G02B 6/4237; G02B 6/4246; G02B 6/4292
USPC ............................................................ 385/93
See application file for complete search history.

(56) References Cited

U.S. PATENT DOCUMENTS

| 5,214,730 | A | 5/1993 | Nagasawa et al. |
| 5,596,665 | A * | 1/1997 | Kurashima et al. ............. 385/92 |
| 7,401,985 | B2 | 7/2008 | Aronson et al. |
| 7,581,891 | B2 | 9/2009 | Wang |
| 7,661,886 | B2 | 2/2010 | Wang et al. |
| 7,794,156 | B2 | 9/2010 | Wang et al. |
| 2011/0081119 | A1 | 4/2011 | Togami et al. |
| 2012/0163754 | A1 * | 6/2012 | Benjamin et al. ............... 385/33 |

FOREIGN PATENT DOCUMENTS

| CN | 1423143 | 6/2003 |
| CN | 102122035 | 7/2011 |

* cited by examiner

*Primary Examiner* — Charlie Peng
*Assistant Examiner* — Jerry Blevins
(74) *Attorney, Agent, or Firm* — Ming Chieh Chang; Wei Te Chung (57) ABSTRACT

An optical-electrical connector (100) includes a housing (11), a circuit board (3) received in the housing and having a transducer for bidirectional optical-electrical signal conversion, a lens member (42) mounted on the circuit board, a ferrule (43) receiving a number of optical channels and having a resisting face (431), a supporting portion (51) having a base wall (511), and a resilient member. The ferrule is situated behind the lens member within the housing and aligned with the lens member along a front-to-back direction. The resilient member is permanently maintained an invariable compressed state between the base wall and the resisting face of the ferrule to provide an invariable forward resilient force to the ferrule for fixing the ferrule to the lens member, when the optical-electrical connector is used and unused.

16 Claims, 10 Drawing Sheets

OPTICAL-ELECTRICAL CONNECTOR HAVING A RESILIENT MEMBER FOR URGING FERRULE AGAINST LENS MEMBER

BACKGROUND OF THE INVENTION

1. Field of the Invention

The present invention relates to an optical-electrical connector, and more particularly to an optical-electrical connector of SFP (Small Form-factor Pluggable) interface including a resilient member for providing a low loss optical coupling between the fibers and the lens member.

2. Description of Related Art

U.S. Pat. No. 7,794,156 issued to Wang et al. on Sep. 14, 2010, U.S. Pat. No. 7,581,891 issued to Wang on Sep. 1, 2009, and U.S. Pat. No. 7,401,985 issued to Aronson et al. on Jul. 22, 2008 each disclose an optical-electrical connector, i.e., an active optical connector or a transceiver. The optical-electrical connector includes a housing, a circuit board having a transducer, a lens member and a ferrule received in the housing, and a plurality of fibers mounted in the ferrule. The ferrule is aligned with the lens member so as to align the plurality of fibers with the lens member for optical signal transmission. The transducer is used for bidirectional optical-electrical signal communication.

It is important to align the ferrule with the lens member reliably; otherwise loss of optical coupling between the fibers and the lens member will result.

U.S. Pat. No. 5,214,730 issued to Nagasawa et al. on May 25, 1993 discloses two MPO (Multiple-Fiber Push-On) connectors. Each MPO connector includes a ferrule carrying a plurality of fibers, a coiled spring situated behind the ferrule, and a shell shrouding the ferrule and the spring. When the two MPO connectors mate with each other, the ferrules of the two MPO connectors are pressed against each other in an axial direction by the coil springs, so as to maintain the connected state under a proper alignment.

The coiled spring providing a resilient force to the ferrule has been used in MPO connector, but has not been applied in an optical-electrical connector of SFP interface. Additionally, the coiled spring would be compressed into different lengths for providing different resilient forces in the mating process.

U.S. Patent Application Publication No. 2011/0081119 published on Apr. 7, 2011 discloses a connector includes a housing, a paddle board received in the housing, a mounting plate vertically mounted on the paddle board, a lens block mounted in the mounting plate, a ferrule carrying a plurality of fibers, a package having an engaging portion engaged with the ferrule and a shoulder portion, a spring confined between the ferrule and the shoulder portion of the package, and a cover engaged with the package and the lens block. The ferrule is aligned with the lens block reliably under a resilient force provided by the spring.

The ferrule is aligned with the lens block and the spring is secured to the ferrule by the package and the cover. The connector has a complicated configuration to provide the package and the cover.

Hence, a differently configured optical-electrical connector having a resilient member is desired.

SUMMARY OF THE INVENTION

Accordingly, an object of the present invention is to provide an optical-electrical connector of a simple configuration having a resilient member providing an invariable resilient force to the ferrule to align the ferrule with the lens member reliably for low loss optical transmission.

In order to achieve the object set forth, an optical-electrical connector includes a housing, a circuit board received in the housing and having a transducer for bidirectional optical-electrical signal conversion, a lens member mounted on the circuit board, a ferrule receiving a plurality of optical channels and having a resisting face, a supporting portion having a base wall and secured in the housing, and a resilient member. one of the lens member and the ferrule has a guide pin, and another one of the lens member and the ferrule has a guide hole. The ferrule is situated behind the lens member within the housing and aligned with the lens member along a front-to-back direction. The resilient member is permanently maintained an invariable compressed state between the base wall and the resisting face of the ferrule to provide an invariable forward resilient force to the ferrule for fixing the ferrule to the lens member, when the optical-electrical connector is used and unused.

The spring is permanently maintained the invariable compressed state between the base wall of the supporting portion and the resisting face of the ferrule to provide an invariable resilient forward force to the ferrule for fixing the ferrule to the lens member, when the optical-electrical connector is plugged into the mating connector and mated with the mating connector in use, and unmated with the mating connector when unused. Therefore, the optical channels in the ferrule could be aligned with the lens member reliably to provide a low loss optical communication. The optical-electrical connector has a simple configuration to provide the supporting portion confining the spring.

Other objects, advantages and novel features of the invention will become more apparent from the following detailed description when taken in conjunction with the accompanying drawings.

DETAILED DESCRIPTION OF THE PREFERRED EMBODIMENT

Reference will now be made in detail to the preferred embodiment of the present invention.

Referring to FIGS. 1 to 7, an optical-electrical connector 100 in accordance with the present invention includes a housing 11 defining a cavity 110, a cover 12 attached to an upper portion of the housing 11, a circuit board 3, an optical member 4, a coiled spring 52, a supporting portion 51, and a mounting portion 53 received in the cavity 110 of the housing 11, a releasing mechanism 2, a restoring spring 81, a cover plate 82, a pair of screws 83 and a cable jacket 6.

Referring to FIGS. 2-3 and 5-6, the housing 11 includes a bottom wall 111 and a pair of side walls 112. Each side wall 112 has a pair of securing tabs 114 projecting inwardly toward the cavity 110, a securing recess 115 between the pair of securing tabs 114, a post 1121 in front of the securing tabs 114, a shoulder portion 116 behind the securing tabs 114, and an up-to-bottom extending mounting hole 117. Each side wall 112 has a cooperating recess 118 defined at an outer face thereof. In conjunction with FIG. 4, the bottom wall 111 has a confining recess 119 defined at an outer face thereof.

Figure 1:
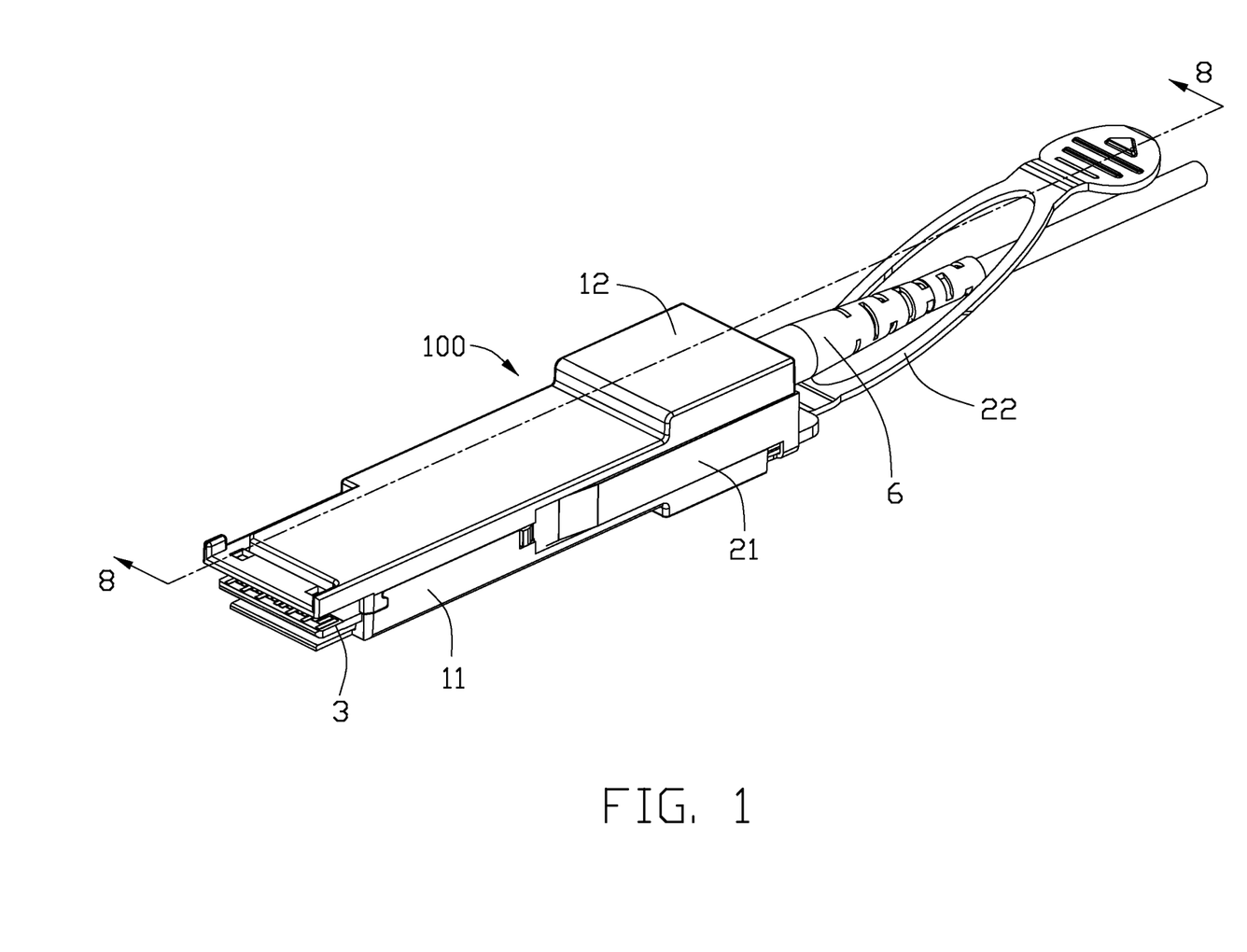
FIG. 1 is an assembled perspective view showing an optical-electrical connector in accordance with a first embodiment of the present invention.
Figure 2:
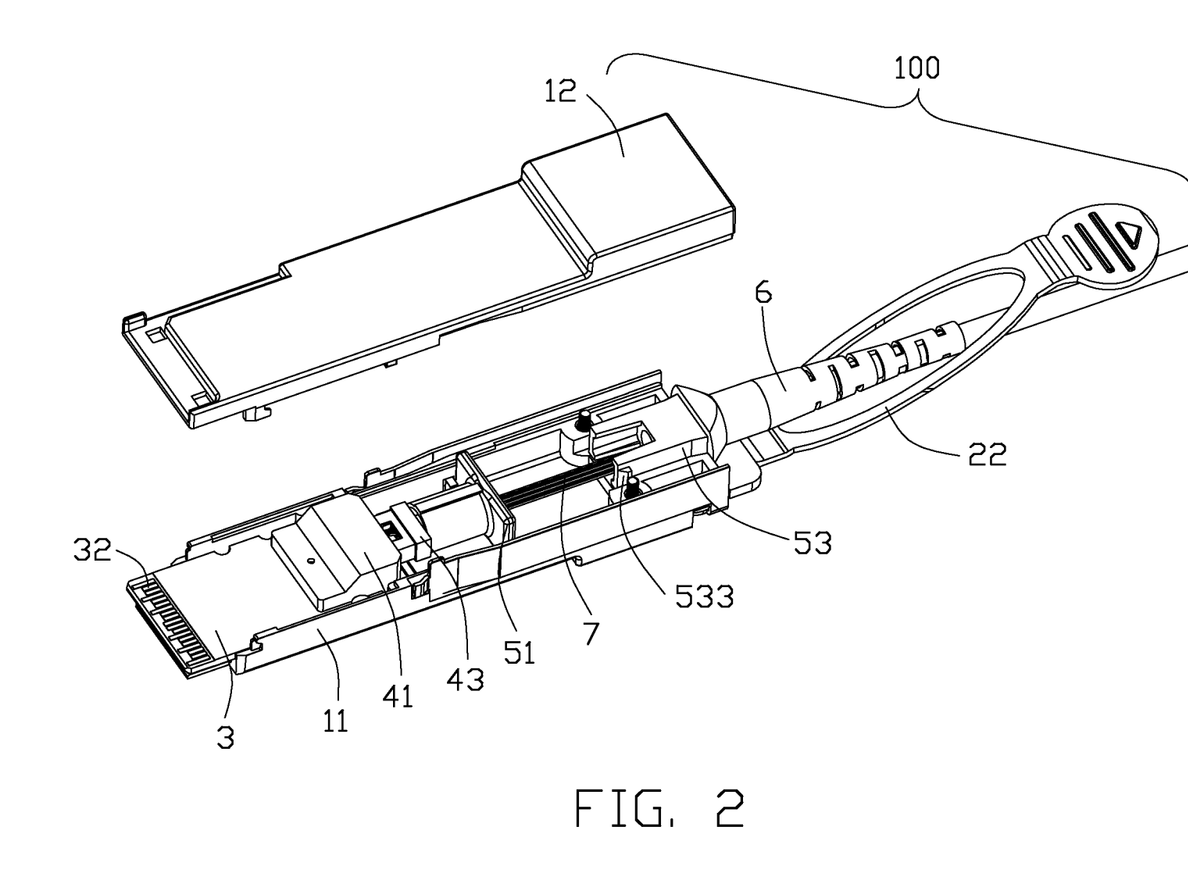
FIG. 2 is a partially assembled perspective view showing the optical-electrical connector shown in FIG. 1, with a cover separated from a housing.
Figure 3:
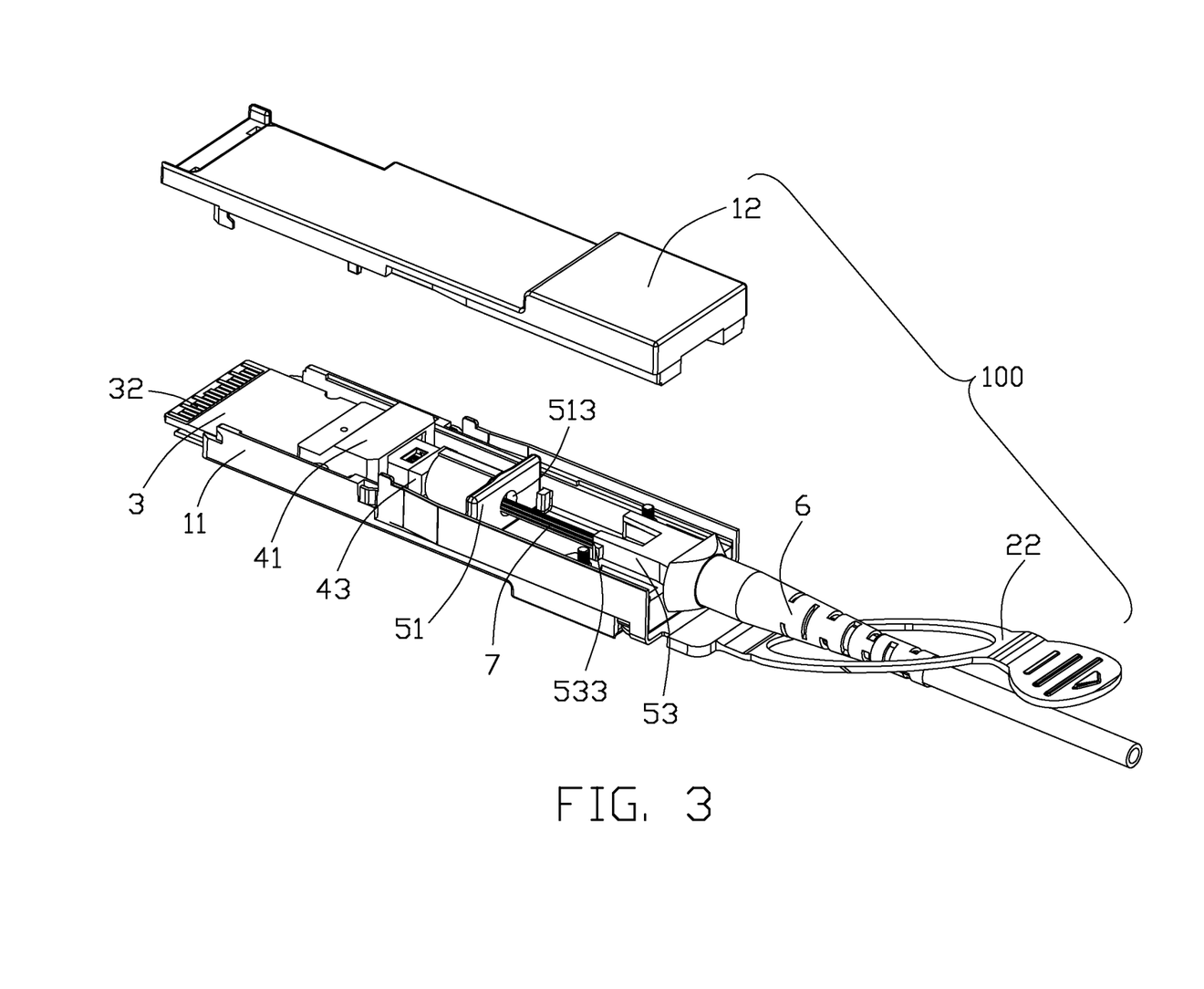
FIG. 3 is a view similar to FIG. 2, taken from another aspect.
Figure 4:
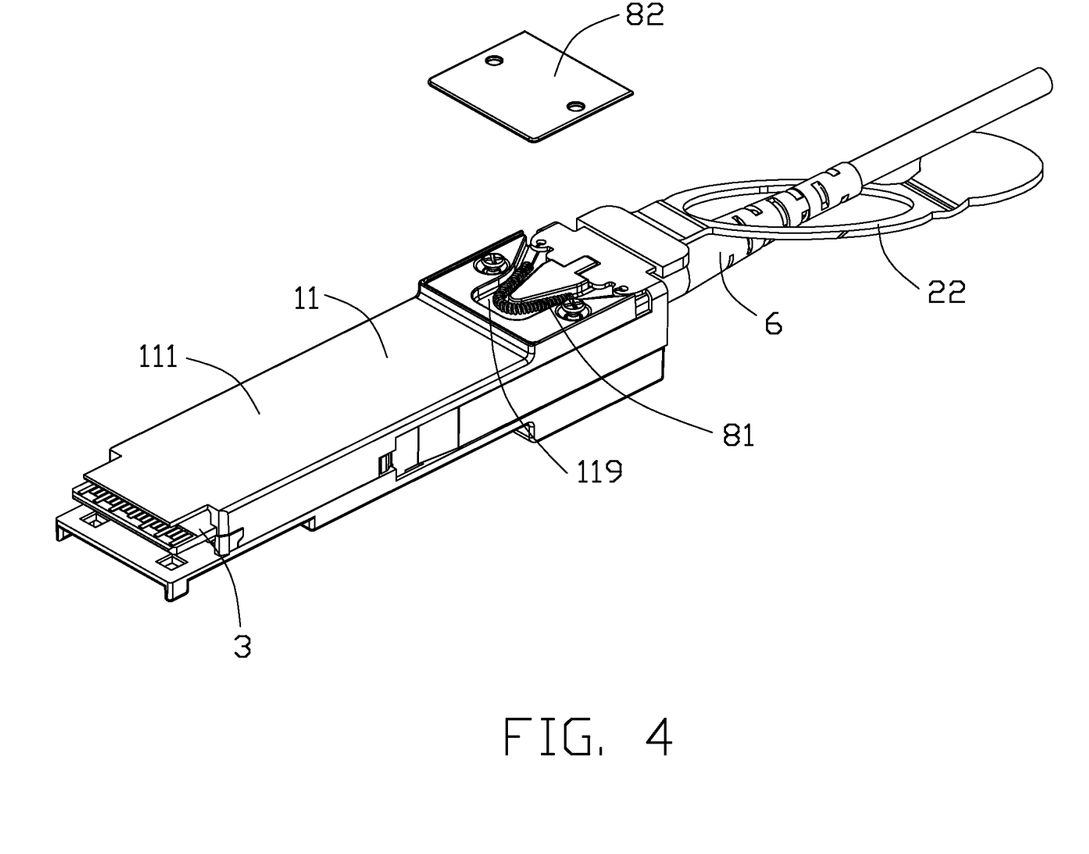
FIG. 4 is a partially exploded view showing the optical-electrical connector, with a cover plate separated from the housing.
Figure 5:
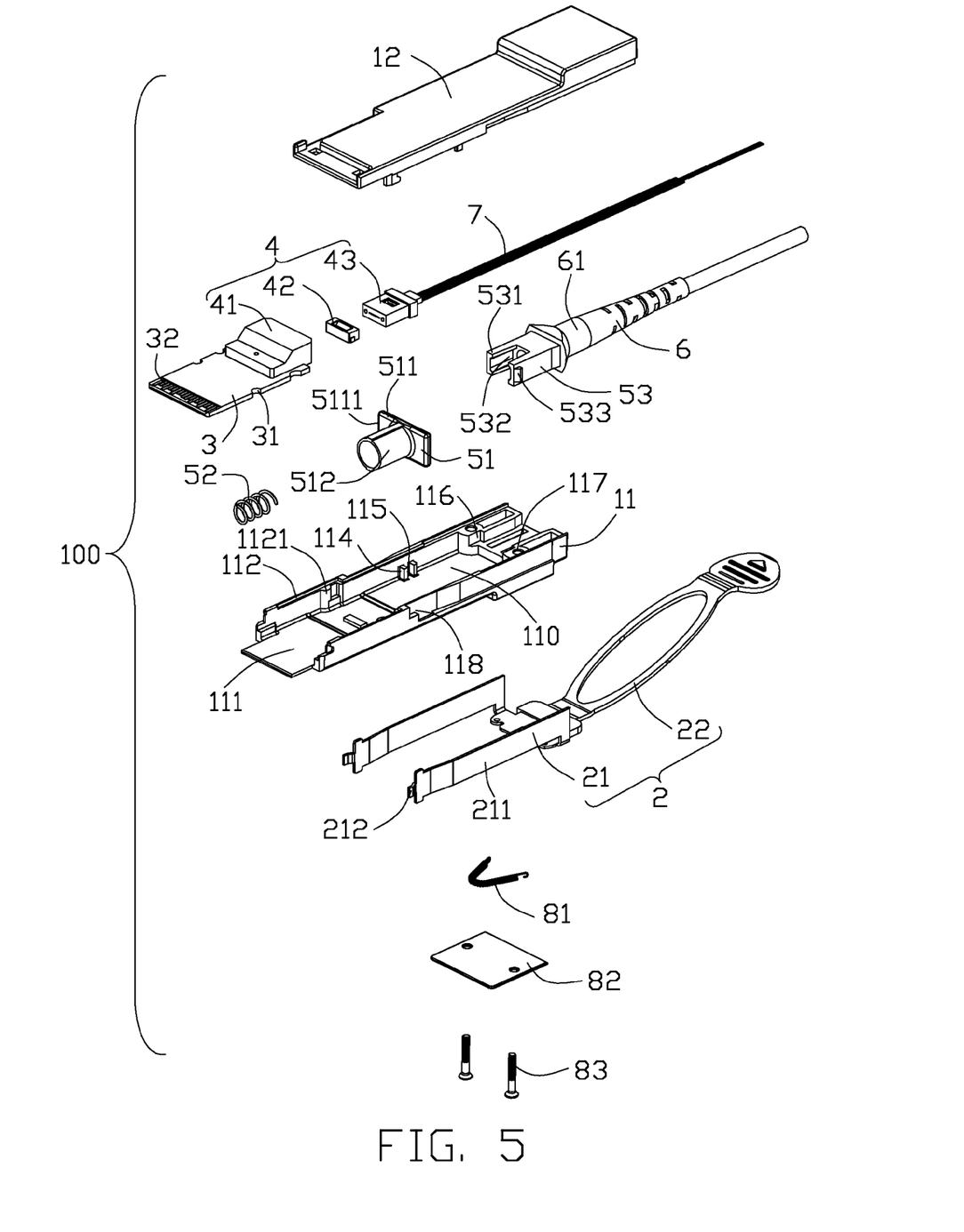
FIG. 5 is an exploded view showing the optical-electrical connector.
Figure 6:
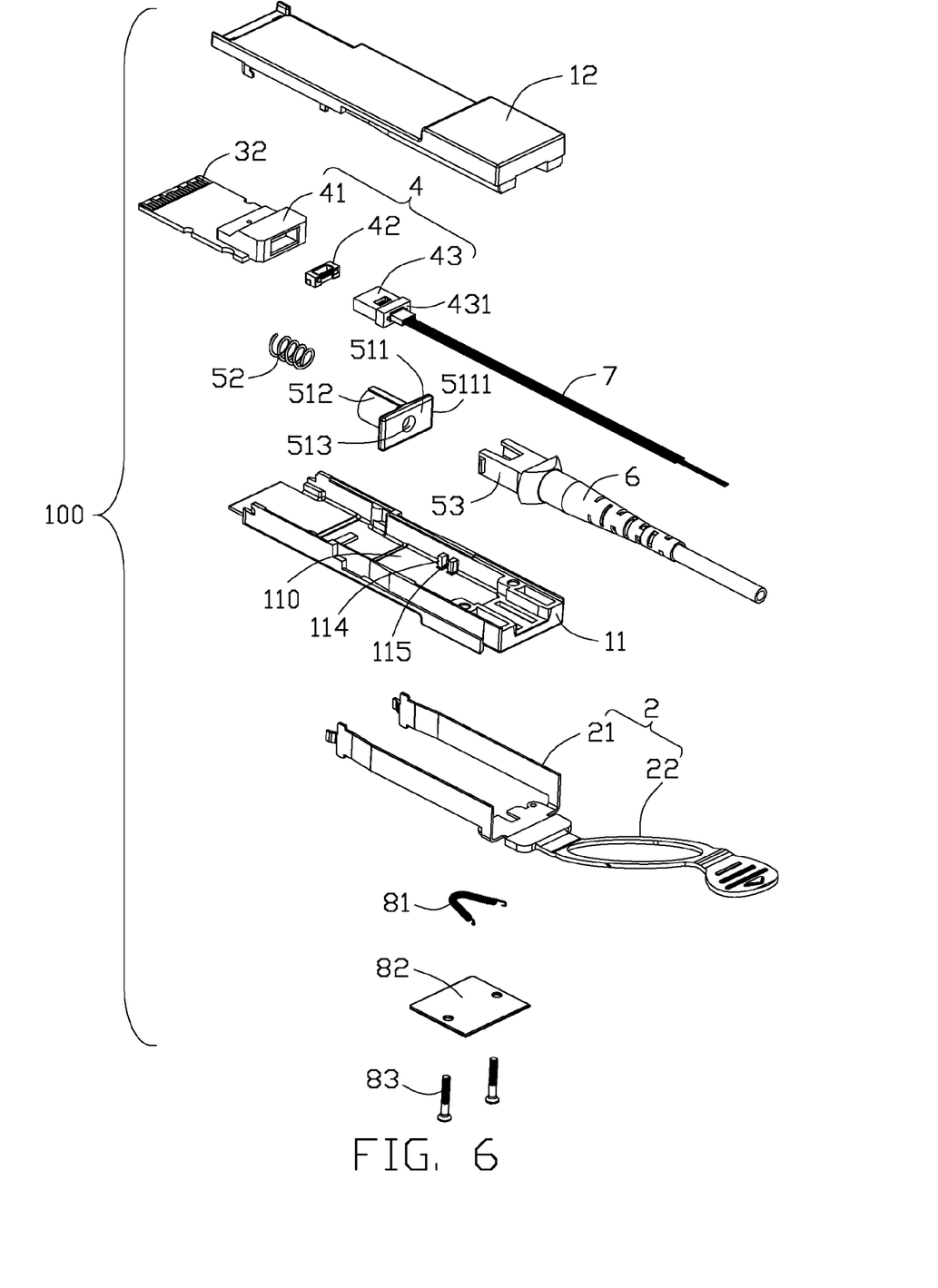
FIG. 6 is an exploded view similar to FIG. 5, taken from another aspect.
Figure 7:
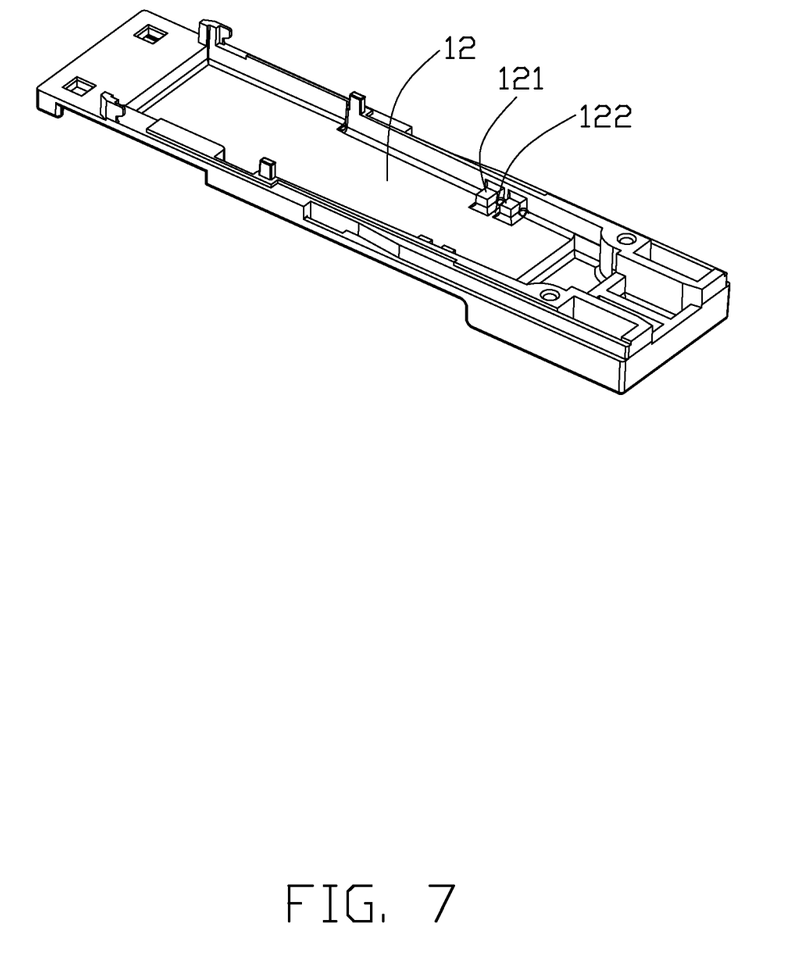
FIG. 7 is a perspective view showing the cover.

In conjunction with FIG. 7, the cover 12 includes two pairs of latching tabs 121, and two latching recesses 122 each defined between one pair of the latching tabs 121.

The circuit board 3 has a plurality of conductive pads 32 formed at a front portion thereof for contacting with a mating connector (not shown), a transducer (not shown) for bidirectional optical-electrical signal conversion and an amplifier (not shown) formed at a rear portion thereof, and a pair of cutouts 31 defined at opposite side edges thereof.

The optical member 4 includes a lens member 42, an outer ferrule or package 41 enclosing the transducer and the lens member 42, and an inner ferrule 43 carrying a plurality of optical fibers or channels and having a resisting face 431. The plurality of optical channels are constituted into a plurality of fibers 7 shrouded by the cable jacket 6 in this embodiment, and could be constituted by waveguides in another embodiment. One of the lens member 42 and the ferrule 43 has two guide pins (not shown), and another one of the lens member 42 and the ferrule 43 has two guide holes (not labeled) respectively engaged with the guide pins.

The supporting portion 51 includes a base wall 511 defining a through hole 513 for insertion of the fibers 7, a holder 512 extending forwardly from the base wall 511 for receiving the spring 52, and a pair of sidewardly extending wings 5111. The pair of wings 5111 are constituted by opposite edge portions of the base wall 511 in this embodiment, and could be formed at a front portion or at a middle portion of the holder 512 in another embodiment.

The mounting portion 53 includes a pair of beam portions 531 and an opening 532 between the pair of beam portions 531. Each beam portion 531 has a hook portion 533 formed at a free end thereof.

The releasing mechanism 2 includes an operator 21 having a pair of beam portions 211 each having a releasing portion 212, and an actuator 22 insert molded with the operator 21.

Referring to FIGS. 1-8, in assembling of the optical-electrical connector 100, the lens member 42 is adhered on the circuit board 3 by glue and disposed above the transducer and the amplifier. The package 41 is adhered on the circuit board 3 by glue for enclosing the lens member 42, the transducer and the amplifier. The circuit board 3 together with the transducer, the amplifier, the lens member 42 and the package 41 is fixed in the cavity 110 of the housing 11, with the cutouts 31 latching with the posts 1121. The ferrule 43 is partially inserted into the package 41 and is situated behind the lens member 42 in alignment with the lens member 42 along a front-to-back direction via an engagement between the guide pin and the guide hole. The spring 52 is received in the holder 512. The spring 52 is permanently compressed between the resisting face 431 of the ferrule 43 and the base wall 511 when the wings 5111 of the supporting portion 51 are confined in the securing recesses 115. The connecting portion 61 of the cable jacket 6 is connected with the mounting portion 53. The mounting portion 53 is received in the cavity 110, with the hook portions 533 engaging with the shoulder portions 116. The cover 12 is attached to an upper portion of the housing 11, with the pair of wings 5111 confined in the pair of latching recesses 122 of the cover 12.

The releasing mechanism 2 is assembled to the housing 11, with the releasing portions 212 received in the cooperating recesses 118. The restoring spring 81 is bent into a V-shape to connect with the operator 21 and is confined in the confining recess 119 for providing a restoring force. The cover plate 82 is attached to the housing 11 for covering the restoring spring 81. The screws 83 are mounted through the mounting holes 117 to fasten the cover 12 to the housing 11.

Figure 8:
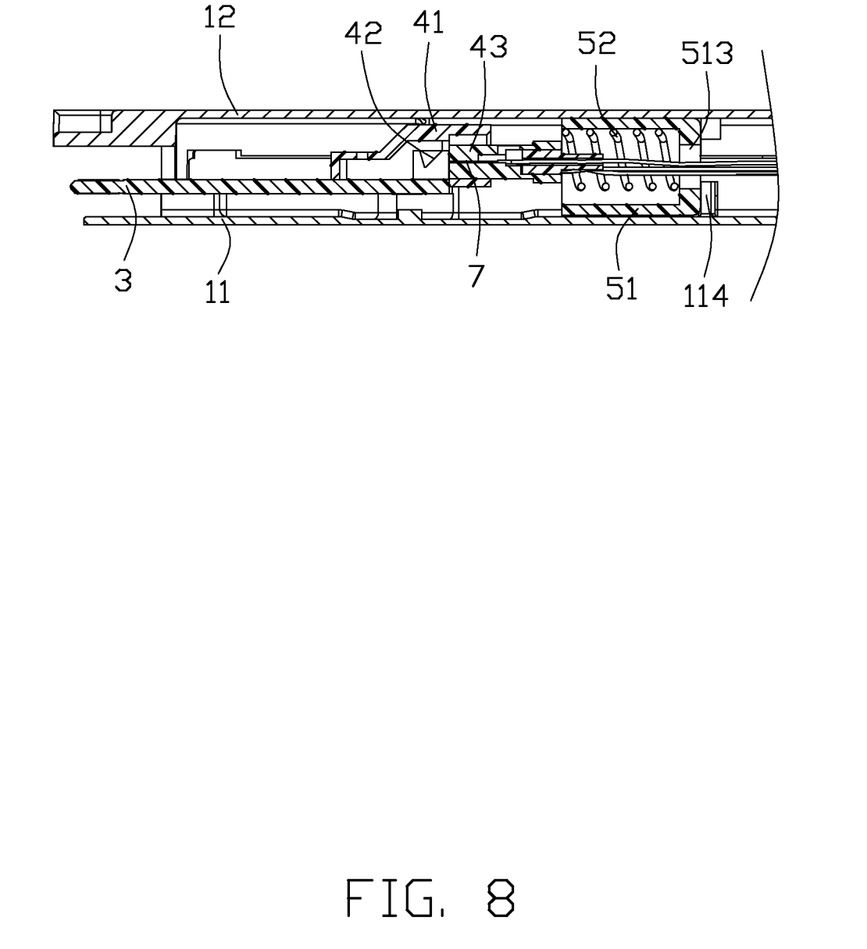
FIG. 8 is a partially cross-sectional view of the optical-electrical connector, taken along line 8-8 of FIG. 1.

Referring to FIG. 8, in a first embodiment, the package 41 protrudes rearwardly across the lens member 42 to define an opening (not labeled) behind the lens member 42. The ferrule 43 is inserted into the package 41 through the opening for being aligned and abutted with the lens member 42.

Figure 9:
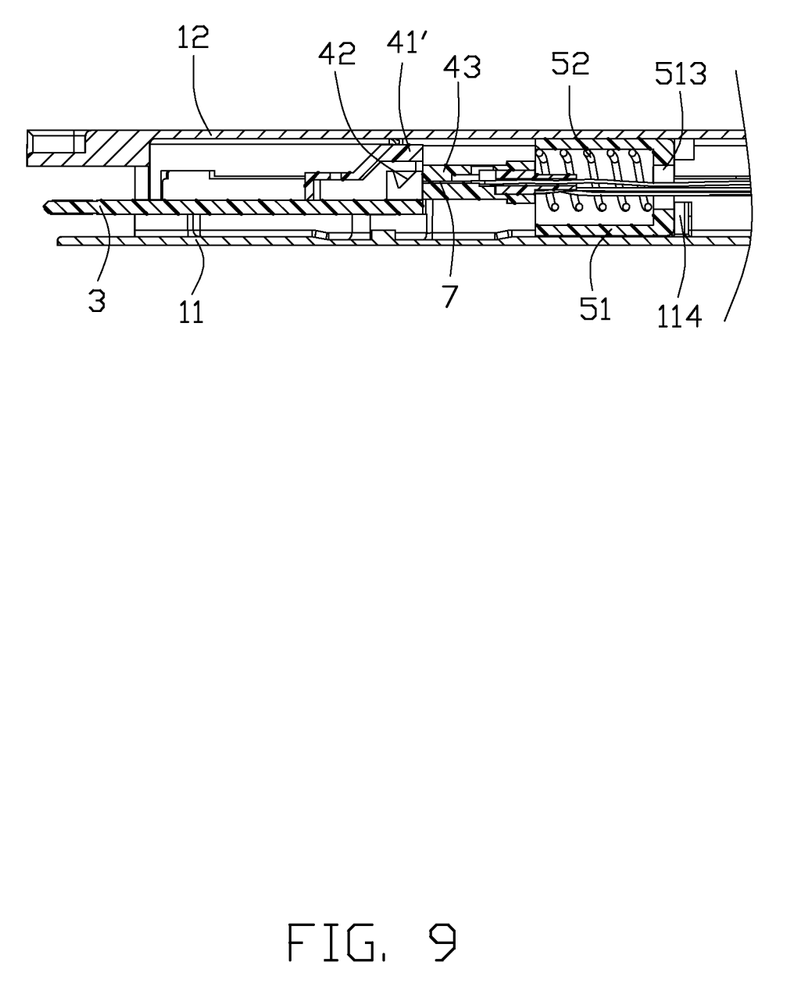
FIG. 9 is a partially cross-sectional view of the optical-electrical connector in another embodiment, taken along line 8-8 of FIG. 1.

Referring to FIG. 9, in another embodiment, the package 41' is aligned with the lens member 42 along a vertical direction. The ferrule 43 is aligned and abutted with the lens member 42 devoid of interfering with the package 41'.

Referring to FIGS. 1-9, the connecting portion 61 of the cable jacket 6 in that embodiment is mounted on the mounting portion 53 by riveting.

Figure 10:
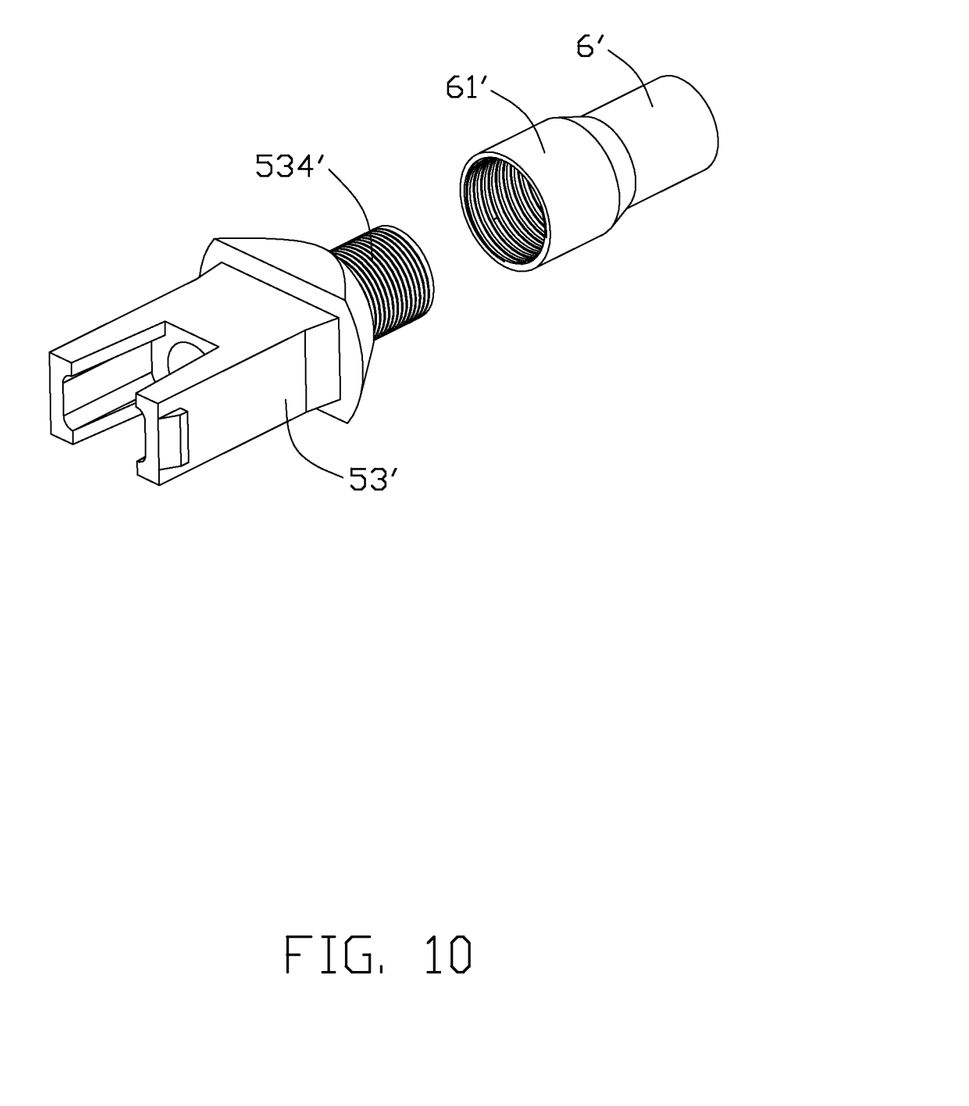
FIG. 10 is a perspective view showing a mounting portion and a cable jacket in a second embodiment.

Referring to FIG. 10, in another embodiment, the mounting portion 53' has a connecting section 534'. The connecting section 534' of the mounting portion 53' and the connecting portion 61' of the cable jacket 6' are respectively formed with screw thread. The connecting portion 61' of the cable jacket 6' is mounted on the connecting section 534' of the mounting portion 53' by screw method.

A distance between the resisting face 431 of the ferrule 43 and the base wall 511 is maintained invariable. The spring 52 confined between the resisting face 431 of the ferrule 43 and the base wall 511 would permanently maintains an invariable compressed state to provide an invariable resilient forward force to the ferrule 43 for fixing the ferrule 43 to the lens member 42, when the optical-electrical connector 100 is plugged into the mating connector and mated with the mating connector in use, and unmated with the mating connector when unused. Therefore, the fibers 7 in the ferrule 43 could be aligned with the lens member 42 along the front-to-back direction reliably to provide a low loss optical communication.

The spring 52 could be optionally formed into other resilient member, if only a forward resilient force could be provided to the ferrule 43. The spring 52 could be optionally fixed to the housing 1 directly at a fixed position, if only the distance between the ferrule 43 and the fixed position is invariable.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical-electrical connector comprising:
a housing including a pair of side walls each having a pair of securing tabs and a securing recess between the pair of securing tabs;
a circuit board received in the housing and having a transducer for bidirectional optical-electrical signal conversion;
a lens member mounted on the circuit board;
a ferrule receiving a plurality of optical channels and having a rear resisting face, one of the lens member and the ferrule having a guide pin, and another one of the lens member and the ferrule having a guide hole, said ferrule being situated behind the lens member within the housing and aligned with the lens member along a front-to-back direction via an engagement between the guide pin and the guide hole;
a supporting portion secured to the housing and having a base wall, a distance between the rear resisting face of the ferrule and the base wall maintained invariable, the supporting portion having a pair of sidewardly extending wings respectively secured in the pair of securing recesses;
a cover attached to an upper portion of the housing; and
a resilient member maintained at a compressed state between the base wall of the supporting portion and the resisting face of the ferrule to provide a forward force to the ferrule for affixing the ferrule to the lens member.

2. The optical-electrical connector as claimed in claim 1, wherein said cover has two pairs of latching tabs, and two latching recesses each defined between one pair of the latching tabs for confining the corresponding wing of the supporting portion.

3. The optical-electrical connector as claimed in claim 1, wherein said supporting portion comprises a holder extending forwardly from the base wall for receiving the spring, said pair of wings constituted by opposite edge portions of the base wall.

4. The optical-electrical connector as claimed in claim 1, wherein one of said circuit board and each side wall of the housing has a cutout, and the other one of the circuit board and each side wall has a post engaging with the cutout.

5. The optical-electrical connector as claimed in claim 1, further comprising a cable jacket having a connecting portion, and wherein said plurality of optical channels consist of a plurality of fibers shrouded by the cable jacket.

6. The optical-electrical connector as claimed in claim 5, further comprising a mounting portion connected with the connecting portion of the cable jacket and including a pair of hook portions, said housing comprising a pair of shoulder portions respectively engaging with the hook portions.

7. The optical-electrical connector as claimed in claim 6, wherein said connecting portion of the cable jacket is mounted on the mounting portion by screw method.

8. The optical-electrical connector as claimed in claim 6, wherein said connecting portion of the cable jacket is mounted on the mounting portion by riveting.

9. The optical-electrical connector as claimed in claim 1, further comprising a package mounted on the circuit board for enclosing the transducer and the lens member.

10. The optical-electrical connector as claimed in claim 9, wherein said package protrudes rearwardly across the lens member to define an opening behind the lens member for insertion of the ferrule.

11. The optical-electrical connector as claimed in claim 9, wherein said package is aligned with the lens member along a vertical direction devoid of interfering with the ferrule.

12. The optical-electrical connector as claimed in claim 9, wherein said lens member and the package are respectively adhered on the circuit board by glue.

13. An optical-electrical connector comprising:
a housing defining a space;
a printed circuit board mounted in the space and defining a front mating tongue region forwardly communicating with an exterior in a front-to-back direction;
an optical member including a lens member positioned upon the printed circuit board at a fixed position for optical-electrical transmission and an inner ferrule carrying a plurality of optical fibers therein, said inner ferrule being in a floating manner and urged forwardly by a spring therebehind so as to have the ferrule with the associated optical fibers constantly intimately abutting against the lens member; and
another spring providing a restoration force upon a puller which is linked to a latch and adapted to move rearwardly to deflect the latch for unlatching, wherein
said inner ferrule further includes an alignment device to have the ferrule moveable only along the front-to-back direction.

14. The optical-electrical connector as claimed in claim 13, wherein the alignment device includes a post on one of the inner ferrule and the lens member, and a hole in the other of the inner ferrule and the lens member for receiving the post.

15. The optical-electrical connector as claimed in claim 13, wherein the optical member further includes an outer ferrule enclosing the lens member and holds the lens member in position.

16. The optical-electrical connector as claimed in claim 15, wherein the outer ferrule further encloses a front portion of the inner ferrule.

\* \* \* \* \*